Feb. 17, 1931.　　　　　R. B. DAY　　　　1,792,823
HEAT DISSIPATING DEVICE FOR ROAD VEHICLES
Filed Nov. 20, 1926
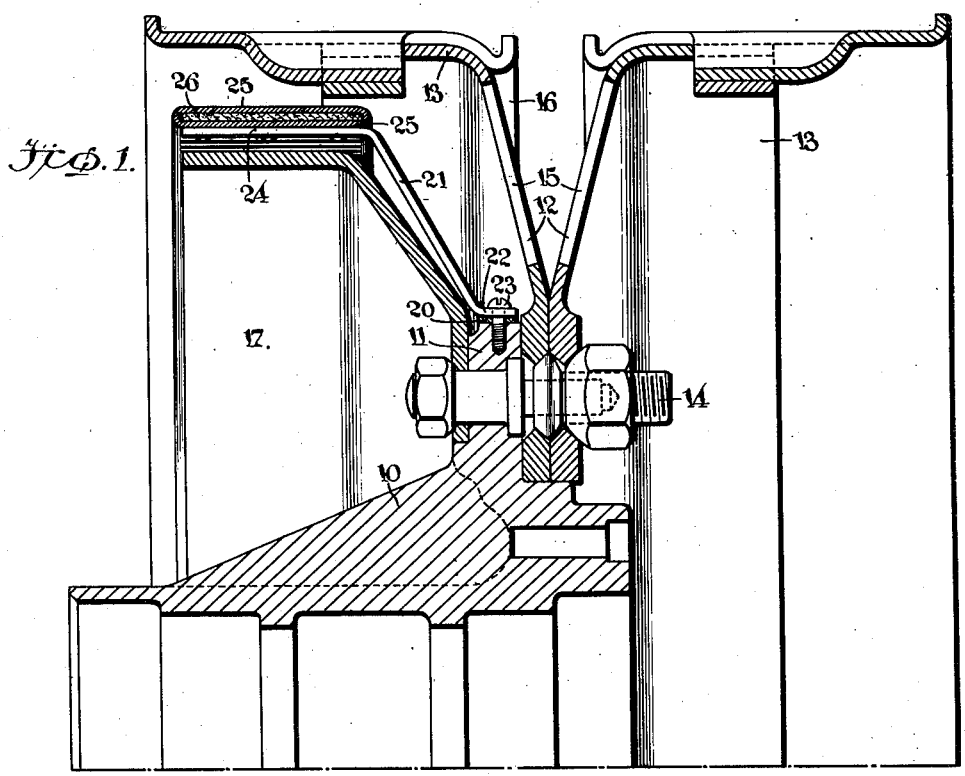
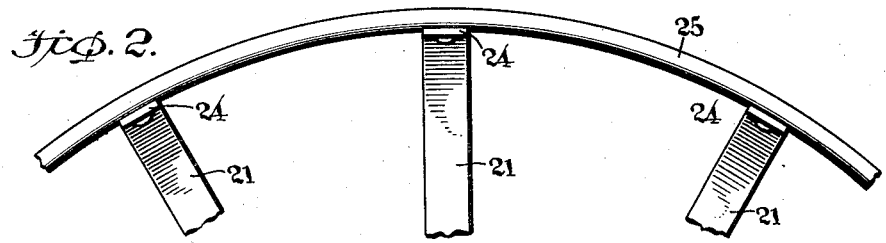
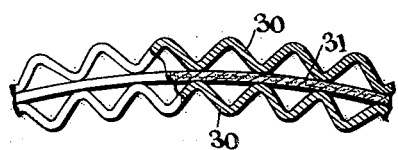
INVENTOR
Ralph B. Day,
BY
ATTORNEY Patented Feb. 17, 1931

1,792,823

UNITED STATES PATENT OFFICE

RALPH B. DAY, OF AKRON, OHIO, ASSIGNOR TO THE GOODYEAR TIRE & RUBBER COMPANY, OF AKRON, OHIO, A CORPORATION OF OHIO

HEAT-DISSIPATING DEVICE FOR ROAD VEHICLES

Application filed November 20, 1926. Serial No. 149,628.

My invention relates to the automotive industry, and it has particular reference to the provision of means to prevent the deterioration of resilient tires for motor vehicles that results from the transmission of heat from the brake drum to the rim of a vehicle wheel.

There has been a tendency during recent years to increase the diameter of brake drums for automobile wheels, to reduce the diameter of the rim, and to equip the wheels with pneumatic tires of relatively large cross sectional diameter. Designs incorporating these features are particularly noticeable in passenger busses intended to travel long distances at high speeds. Relatively large brake drums have been adopted as a matter of safety, and large pneumatic tires are desirable because of their cushioning properties.

The net effect of these alterations has been to decrease materially the distance between the outer periphery of the brake drum and the inner periphery of the rim. The increased size of the brakes, the frequency of their application, and the high speed at which the vehicle is driven, result in the generation of a great quantity of heat. This energy finds its way across the short gap between the brake drum and the rim, and affects the tire in a very undesirable manner. At the present time, it is common experience to find that the inner tubes of pneumatic bus tires have so deteriorated, because of the temperatures to which they have been subjected, that they are worthless after having been driven only a few hundred miles.

It is accordingly desirable to provide means to minimize the deleterious effects of heat so transmitted, in order to increase the margin of operating safety, and to lengthen the life of the tires. Since the effects of the phenomena occurring are new in this particular field, it is apparent that the provision of satisfactory means can best be made only after a determination of all of the factors involved.

I have discovered that the transmission of energy between the brake band and the rim is accomplished to a large extent by means of radiation, and that the ratio of the quantity of radiated heat to the quantity of conducted heat, and heat transmitted by convection, is relatively high. Hence, in developing means to prevent the flow of heat energy at a high temperature, particular attention should be paid to the impedance of radiation from the brake drum to the tire.

In the drawings, which illustrate typical means to prevent the transmission of heat:

Fig. 1 is a fragmentary cross-sectional view of an omnibus wheel assembly, showing one form of preventive means in operative position;

Fig. 2 is a fragmentary side elevational view of the preventive means shown in Fig. 1;

Fig. 3 is a fragmentary side elevational view of another form of construction embodying the principles of the invention; and, Fig. 4 is a detail view, partially in side elevation, and partially in cross-section, showing the construction of an additional form of preventive means.

The assembly shown in Fig. 1 comprises a wheel having a hub 10 and a radially disposed flange 11. A pair of wheel discs 12, whose outer portions are turned laterally to provide felloes 13, are secured to the flange 11 by suitable means, such as a plurality of bolts 14. Each wheel disc 12 is provided with radially disposed apertures or perforations 15, to permit access to the valves of the tires. Rims 16, adapted to receive pneumatic tires, are positioned on the outer peripheries of the felloes 13. A brake drum 17 is secured to the inner face of the flange 11, for the reception of a conventional brake mechanism.

Means are disposed between the outer periphery of the brake drum 17 and the rim 16 to interrupt the transmission of heat to the tires. The means shown in Figs. 1 and 2 comprises a ring 20, positioned around the periphery of the member 11, to which is secured a plurality of spokes 21, disposed at an angle to the axis of the wheel to overlie the brake drum 17. The inner ends of the spokes are bent to provide flanges 22, which bear against the ring 20, and which are perforated for the reception of screws 23 that hold the parts in assembled relation.

The outer ends 24 of the spokes 21 are turned to overlie the cylindrical portion of the brake drum 17 between the outer surface thereof and the rim 16 and felloe 13. A heat deflector and interceptor is secured to the flanges 24 of the spokes 21, and it includes a pair of spaced concentrically disposed cylindrical bands 25, that may be joined at their margins. A packing of suitable non-conducting material 26, such as asbestos, is positioned in the space between the bands 25. The surfaces of the bands are smooth, in order to reflect the heat, and, if desired, they may be given a mirror-like polish.

It will be noted that the bands 25 do not contact with either the felloe, rim, or brake drum. The desirability of this construction will become apparent from a consideration of the phenomena present during operation. If the bands contacted with the surface of the drum, energy, in the form of heat, could not be transmitted as readily across the gap between the brake drum 17 and the rim 16 as would be the case if no insulator were provided. The heat would, however, be retained primarily within the brake drum, causing a marked increase in temperature, with a consequent deterioration of the brake lining. The heat generated often melts the grease around the axle bearings, thus affecting adversely their successful operation and life.

As a corollary proposition, heat would not penetrate to the tube as quickly if a band of asbestos were positioned on the felloe or rim. When, however, the band of insulating material attained a high temperature, heat transmission would be resumed, with resulting deterioration of the inner tube.

It will be seen, therefore, that if all of the heat were transmitted by conduction and convection, it would still be desirable to space the intercepting bands from the brake drum. It would not, however, be expedient to surround the asbestos with bands of metal, since such material is a good conductor of heat. The provision of the metallic bands is particularly advantageous to reduce the quantity of heat transmitted by means of radiation, which, it has been discovered, constitutes a large percentage of the total energy absorbed by the tire.

The surfaces of the bands 25 reflect part of the waves of radiant heat energy which impinge upon them, and return them to the gap between the bands and the brake drum 24. Continued reflection and deflection causes a portion of this energy eventually to be directed parallel to the axis of the wheel and hence away from the tube. The temperature of the interceptor is, of course, increased appreciably above the temperature of the surrounding air, and a certain amount of the heat absorbed is re-radiated to the rim. However, the quantity of energy so transmitted is materially diminished, and consequently the tire is afforded protection. Air currents, which are in part created around the interceptor during movements of the vehicle, or which flow through the apertures 15 in the radially disposed portions of the wheel, remove much of the heat contained within the interceptor.

It will be seen, therefore, that the spacing of the bands 25 and the asbestos packing 26 permits of a highly efficient dissipation of heat generated within the brake drum. Obviously, a certain reduction in the temperature of the tire can be obtained by disposing the interceptor in contact with the brake drum, but the construction described is much to be preferred.

The construction shown in Fig. 3 differs from that shown in Figs. 1 and 2, in that the edges of the bands 25 are not joined, and the non-conducting material 27 is corrugated. This alteration provides air gaps 28 between the bands 25 and the insulator 27, which facilitates the removal of heat by ventilation.

The deflector illustrated in Fig. 4 comprises a pair of transversely corrugated polished metallic bands 30, which are spaced by means of a ring of asbestos 31. The provision of the corrugations in the reflecting bands is useful to deflect heat in the form of radiant energy. It is apparent that other constructions may be developed by those skilled in the art, and the examples given should be regarded as illustrative, rather than exhaustive.

From the foregoing description, it will be seen that means have been provided to prevent the deterioration of automobile tires from heat generated within the brake drum. While the invention particularly contemplates means to intercept radiant energy, it comprehends, in its broader aspect, the prevention of heat transmission by any method. Accordingly, the scope of the invention should not be limited by the specific examples given to illustrate the principles thereof, but only such limitations should be imposed as are set forth in the following claims.

What I claim is:

1. In a wheel assembly comprising a felloe adapted to receive a resilient tire, and a brake mechanism, a band of heat intercepting material disposed in spaced concentric relation between the felloe and the mechanism and positioned therebetween.

2. In a wheel assembly comprising a felloe adapted to receive a resilient tire, and a brake drum disposed within the inner periphery of the felloe and in concentric relation therewith, means independent of the drum disposed between the felloe and the brake drum particularly adapted to reduce the quantity of radiant heat energy.

3. In a wheel assembly comprising a felloe adapted to receive a resilient tire, and a brake drum, a continuous band of metallic like material disposed between the felloe and the drum, and a band of asbestos independent of the drum positioned between the felloe and the outer periphery of the drum.

4. In a wheel assembly comprising a hub, rim supporting means secured to the hub, a brake mechanism, and a rim having a tire thereon, a band disposed within the rim and spaced therefrom including material substantially impervious to conducted heat and material particularly adapted to deflect radiant heat energy, said band and material being independent of the brake mechanism.

5. In a wheel assembly comprising a felloe adapted to receive a resilient tire, and a brake mechanism, a continuous heat intercepting wall constituting a rigid portion of the assembly, said wall being disposed in spaced relation between the brake mechanism and the felloe.

6. A brake drum heat dissipating device for vehicle wheels comprising means independent of any braking device arranged between the brake drum and tire rim in spaced concentric relationship thereto for dissipating by radiation the heat generated in the brake drum and for preventing the same affecting the tire rim.

7. A brake drum heat dissipating device comprising a band of heat radiating material independent of any braking device arranged in radially spaced relation to the brake drum and the rim for dissipating by radiation the heat generated in the brake drum and preventing the same affecting the rim.

In witness whereof, I have hereunto signed my name.

RALPH B. DAY.